United States Patent [19]

Pino

[11] Patent Number: 4,764,996
[45] Date of Patent: Aug. 23, 1988

[54] WATER SAVING DEVICE FOR WATER CLOSET

[76] Inventor: Charles W. Pino, 7815 Jordon Park Blvd., Forestville, Md. 20747

[21] Appl. No.: 56,876

[22] Filed: Jun. 3, 1987

[51] Int. Cl.⁴ .............................................. E03D 1/00
[52] U.S. Cl. .......................................... 4/415; 4/324; 4/366; 4/661; 137/441; 138/46
[58] Field of Search ................... 4/366, 415, 300, 353, 4/391, 661; 138/46; 251/10; 137/441

[56] References Cited

U.S. PATENT DOCUMENTS

| | | | |
|---|---|---|---|
| 2,743,459 | 5/1956 | Schmidt et al. | 4/353 |
| 3,902,201 | 9/1975 | Bobo | 4/366 |
| 4,097,020 | 6/1978 | Sussman | 251/10 |
| 4,145,775 | 3/1979 | Butler | 4/391 |
| 4,346,869 | 8/1982 | MacNeill | 251/10 |
| 4,453,295 | 6/1984 | Laszczower | 251/10 |

*Primary Examiner*—Henry K. Artis
*Attorney, Agent, or Firm*—Eric P. Schellin

[57] ABSTRACT

A water saving device is provided in the form of a plastic compressable flow control tube with a pinch clamp which may be installed as a substitute for the refill tube for the toilet bowel of a water closet, and which may be adjusted to establish the proper amount of refill water to flow into the toilet bowl after each flush so as to avoid wastage.

2 Claims, 1 Drawing Sheet

WATER SAVING DEVICE FOR WATER CLOSET

BACKGROUND OF THE INVENTION

There has been considerable activity to control the use of water. Every means has been explored with regard to reducing wastage. For instance steps have been taken to reduce the quantity of water being introduced into a toilet bowl in order to fill the bowl to at least the U-trap level. It is necessary to have at least that much water in the toilet bowl so that noxious fumes cannot flow back from a sewer system. This control of water flow has been affected by reducing the flow stream volume to the overflow tube that connects to the toilet bowl.

In other words, the tube to the overflow tube carries water as long as the valve is open that is controlled by the float whereby as water flows into the water closet tank refill water is entering the overflow tube and is thereby refilling the tank bowl. By slowing the stream to the overflow tube during the water closet refill cycle less water is distributed into the overflow tube and hence to the toilet bowl itself.

In U.S. Pat. No. 4,145,775 to Butler considerable progress has been made in controlling the fluid volume into the overflow tube. This patent is incorporated herein by reference in its entirety.

SUMMARY OF THE INVENTION

The present invention is a considerable improvement over the prior art. The refill tube is made of a flexible plastic. It has a conventional pinch clamp to act as a valve and to control the volume of water distributed. One end has a threaded metal fitting for attachment to the valve structure. The other end has a severe "S" configuration whereby one open end fits into the said end of the tube and the other end fits onto the upwardly facing edge of the overflow tube.

DETAILED DESCRIPTION

Figure 1:
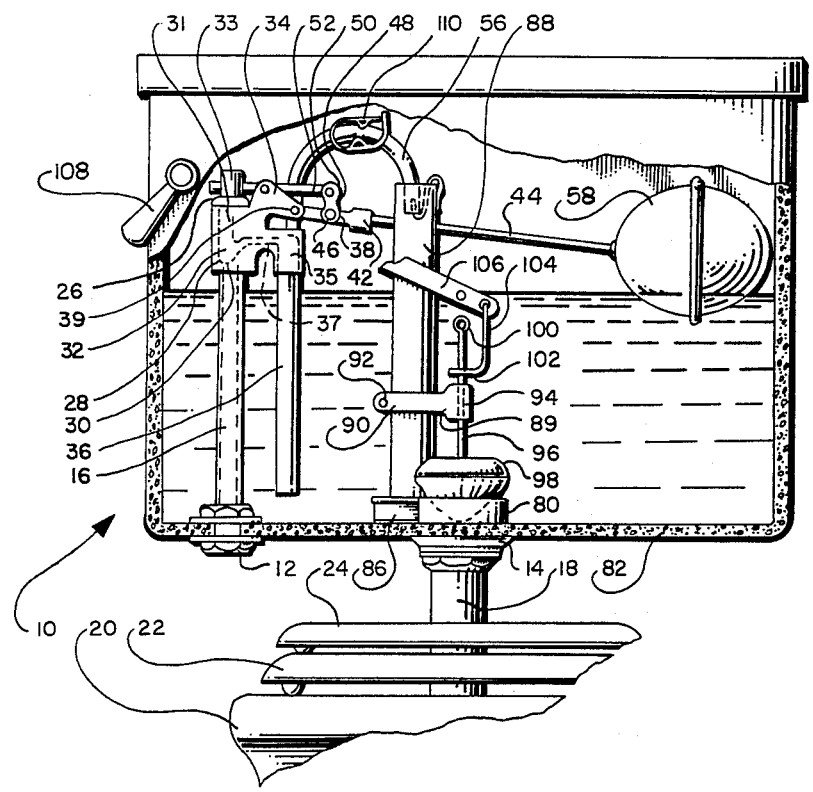
FIG. 1 is a part side elevation and part sectional view of a water closet bowl and tank, parts being shown broken away, and showing the position of the parts when a predetermined amount of water is stored in the tank.

Referring now to the drawing, in FIG. 1 there is shown a conventional water closet tank which may be formed of metal, plastic, vitreous china, or the like. The tank is provided with an inlet 12 extending through its bottom adjacent to one side thereof, and with an outlet 14 extending through its bottom at a central position in the tank. A conduit 16 is positioned in the inlet 12 inside the tank, and this conduit is adapted to be connected to a pressurized water source. A discharge or outlet pipe 18 is connected at its top end to the discharge outlet 14, and this pipe 18 is connected at its bottom end to a conventional toilet bowl 20. The bowl 20 is provided with a conventional toilet seat 22 and cover 24.

An intake valve is mounted on the top of the intake conduit 16, the intake valve including a valve casing 26 with a vertically disposed bore 28 therein, and with a valve seat 30 at the bottom of the bore. A valve stem 31 has a ball valve 32 connected thereo, seated against seat 30, and the stem has its opposite end connected to a sliding piston 33 mounted in the bore 28 of the valve casing.

The valve casing 26 is formed with a triangular-shaped arm 34 extending into the tank and with a downwardly extending opening outlet 35 connected to bore 28 by a bypass 37 and closet filling tube 36. As shown, the tube 36 extends downwardly with its open end spaced from the bottom of the tank in order to prevent splashing of the water and noise when the tank is filling by discharge beneath the surface of the water stored in the tank.

A lever 38 has one end pivotally connected by means of a pivot pin 39 to the free corner of the arm 34, the other end of the lever being formed with a socket 42. One end of the float rod 44 is secured in the socket 42. A ball float 58 is connected to the other end of the float rod 44. Pivoted at 46 to the lever 38 is a link 48, the link being pivoted at its other end, as indicated at 50, to a lever 52. The lever 52 is pivoted midway between its ends to the arm 34, and is pivoted at its other end to the piston 33 to drive it open in one direction and closed in the other. The piston 33 controls the flow of liquid through the valve in the usual manner. A downwardly curved tube 56 is coupled to the top of the outlet 35, and the other end of tube 56 extends into overflow pipe 88 to discharge refill water through the overflow pipe into the toilet bowl after each flush, and when the tank is practically empty. The tube 56 is of plastic, has a threaded fitting at one end and a wire "S" shaped connector at the other end for attaching the tube 56 to the rim of the overflow pipe 88. The tube 56 is attached in a manner whereby any water stream emanating from tube 56 is directed into the overflow pipe 88.

A valve seat 80 is mounted on the bottom wall 82 of tank 10 around the outlet 14, and a laterally extending panlike seat 86 is formed integrally with the seat 80 for supporting the overflow pipe 88. A brakcet 94 is removably supported on the overflow pipe 88 intermediate its ends. The bracket includes a bifurcated end 90 and circles the overflow tube and is fastened thereto by a wing nut 92. The other end of the bracket is formed with a vertically disposed integral seat portion 94. A valve stem 96 extends loosely through the sleeve and carries a frusto-conical shaped ball 98 on its bottom end. The ball is adapted to fit upon the valve seat 80, and it serves to prevent the water from escaping downwardly through the discharge outlet 14. The other end of stem 96 is formed with a loop 100 which is adapted to interlock with and limit movement of the loop end 102 of a link 104 fastened to one end of a tiltably supported elongated lever 106, the other end of the lever being operatively connected to an actuating handle 108 mounted on the outside of the tank. In operation, when the water is low in the tank, and when the ball 58 has descended to its lowermost position, the lever 38 is moved to draw the link 48 to the right in FIG. 1, to swing lever 52 around its pivot point and thereby cause piston 33 to move the valve from its seat and permit the water to flow through the supply pipe 16 and through the valve casing into the filling pipe 36, and from the pipe 36 into the tank. When the ball float 58 rises, the valve ball 32 in the valve casing 26 is gradually closed upon its seat 30, such closing being assisted by the force of the water.

As stated above, when the tank 10 is practically empty, and the float ball 58 is adjacent the bottom of the tank, a quantity of refill water is caused to pass through the tube 56 and through the overflow pipe 88 into the toilet bowl. As stated in the above, the usual toilet design is such that too much refill water is passed into the toilet bowl during each refill operation, so that substantial water wastage occurs.

In accordance with the concepts of the present invention, the conventional refill tube is removed and the tube 56 of the present invention is substituted therefor. The fitment 59 on tube 56 is used in the replacement of the conventional tube. The pinch clamp 55 is interposed intermediate. There are numerous pinch clamps. For instance such pinch clamps as those disclosed in U.S. Pat. Nos. 4,097,020 and 4,589,626 are applicable. They are herewith incorporated by reference in their entireties.

The substitute replacement tube 56 has an "S" shaped wire 57 secured to the end opposite to the fitment for securing to the upwardly extending rim of the overflow pipe as seen from the figure.

The pinch clamp 55 acts as a valve to control the water flow until exactly the proper amount of refill water flows into the toilet bowl 20 after each flush, and there is no wastage due to excessive refill water being introduced into the bowl after each flush.

Figure 2:
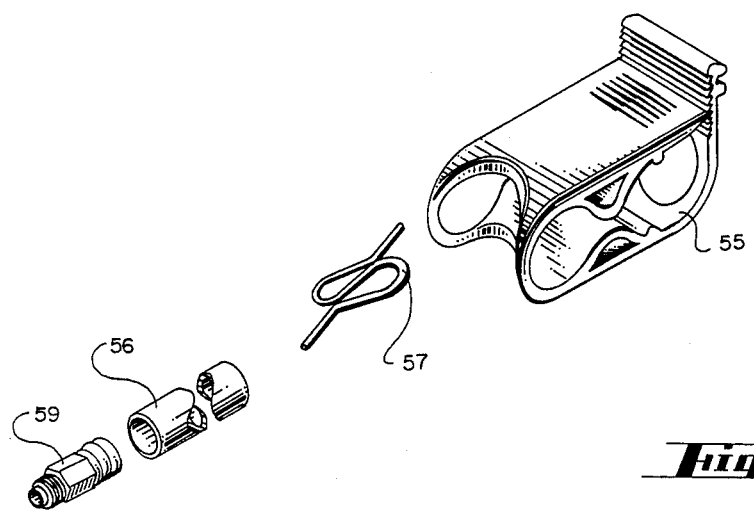
FIG. 2 is a view of the flow control tube valve of the present invention in one of its embodiments.

The particular embodiment of the invention shown in FIGS. 1 and 2 is appropriate for existing toilets since it can be readily installed into an existing toilet merely by substituting the refill tube with the herein disclosed embodiment.

While a particular embodiment of the invention has been shown and described, modifications may be made. It is intended in the claims to cover the modifications which come within the true spirit and scope of the invention.

What is claimed is:

1. In a water closet including a toilet bowl, and a toilet tank for supplying flush water to the bowl wherein said tank has outlet means including a flexible tubular refill conduit for supplying water to the bowl after each flush, the improvement comprising: a plastic pinch clamp interposed on said refill conduit for controlling the amount of refill water supplied to said outlet means after each flush; a threaded fitment installed in said refill conduit and an "S" shaped wire secured in said fitment and affixed to the rim of an overflow tube.

2. The flexible tubular conduit of claim 1 wherein said fitment is a threaded brass fitment.

* * * * *